US012256331B2

(12) United States Patent
Hosseini et al.

(10) Patent No.: US 12,256,331 B2
(45) Date of Patent: Mar. 18, 2025

(54) SIDELINK GO-TO-SLEEP INDICATION

(71) Applicant: QUALCOMM Incorporated, San Diego, CA (US)

(72) Inventors: Seyedkianoush Hosseini, San Diego, CA (US); Yuchul Kim, San Diego, CA (US); Wanshi Chen, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/654,657

(22) Filed: Mar. 14, 2022

(65) Prior Publication Data

US 2022/0295407 A1 Sep. 15, 2022

Related U.S. Application Data

(60) Provisional application No. 63/161,290, filed on Mar. 15, 2021.

(51) Int. Cl.
*H04W 52/02* (2009.01)

(52) U.S. Cl.
CPC ............... *H04W 52/0235* (2013.01)

(58) Field of Classification Search
CPC ........... H04W 52/0235; H04W 68/02; H04W 52/0229; H04W 52/0206; H04W 52/0216; H04W 72/20
USPC .......................................... 370/311; 455/574
See application file for complete search history.

(56) References Cited

U.S. PATENT DOCUMENTS

| 8,320,965 | B2 * | 11/2012 | Kwun | ............... | H04W 52/0206 |
|-----------|------|---------|------|----------------|--------------|
| | | | | | 455/574 |
| 11,751,141 | B2 * | 9/2023 | Wu | ............... | H04W 72/20 |
| | | | | | 370/311 |
| 11,758,481 | B2 * | 9/2023 | Ding | ............... | H04W 52/0235 |
| | | | | | 370/311 |
| 2009/0285143 | A1 * | 11/2009 | Kwun | ............... | H04W 52/0229 |
| | | | | | 370/311 |
| 2020/0296668 | A1 | 9/2020 | Xu et al. | | |
| 2021/0037468 | A1 | 2/2021 | Huang et al. | | |

(Continued)

FOREIGN PATENT DOCUMENTS

| WO | 2020145878 A1 | 7/2020 |
| WO | 2020256462 A1 | 12/2020 |

(Continued)

OTHER PUBLICATIONS

K.-H. Lin, H.-H. Liu, K.-H. Hu, A. Huang and H.-Y. Wei, "A Survey on DRX Mechanism: Device Power Saving From LTE and 5G New Radio to 6G Communication Systems," in IEEE Communications Surveys & Tutorials, vol. 25, No. 1, pp. 156-183, Firstquarter 2023, doi: 10.1109/COMST.2022.3217854 (Year: 2023).*

(Continued)

*Primary Examiner* — William D Cumming
(74) *Attorney, Agent, or Firm* — Harrity & Harrity, LLP

(57) ABSTRACT

Various aspects of the present disclosure generally relate to wireless communication. In some aspects, a user equipment (UE) may transmit or receive a go-to-sleep (GTS) indication relating to sidelink communication. The UE may enter a sleep state based at least in part on the GTS indication. Numerous other aspects are described.

30 Claims, 9 Drawing Sheets

(56) References Cited

U.S. PATENT DOCUMENTS

2021/0051587 A1* 2/2021 Wu .................. H04W 68/02
2021/0306948 A1* 9/2021 Ding ................ H04W 52/0216

FOREIGN PATENT DOCUMENTS

WO    WO-2021194693 A1 * 9/2021  ........... H04L 1/1812
WO    WO-2022243049 A1 * 11/2022  ........ H04W 52/0216

OTHER PUBLICATIONS

Intel Corporation: "Sidelink Enhancements for UE Power Saving", 3GPP TSG RAN WG1 Meeting #102-E, R1-2005896, 3rd Generation Partnership Project, Mobile Competence Centre, 650, Route Des Lucioles, F-06921, Sophia-Antipolis Cedex, France, vol. RAN WG1, No. e-Meeting, Aug. 17-Aug. 28, 2020, Aug. 8, 2020, XP051917798, 9 Pages.
International Search Report and Written Opinion—PCT/US2022/071160—ISA/EPO—Jun. 20, 2022.

* cited by examiner

SIDELINK GO-TO-SLEEP INDICATION

CROSS-REFERENCE TO RELATED APPLICATION

This patent application claims priority to U.S. Provisional Patent Application No. 63/161,290, filed on Mar. 15, 2021, entitled "SIDELINK GO-TO-SLEEP INDICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink go-to-sleep (GTS) indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory including instructions executable by the one or more processors to cause the UE to: transmit or receive a go-to-sleep (GTS) indication relating to sidelink communication; and enter a sleep state based at least in part on the GTS indication.

In some aspects, a method of wireless communication performed by a UE includes transmitting or receiving a GTS indication relating to sidelink communication; and entering a sleep state based at least in part on the GTS indication.

In some aspects, a non-transitory computer-readable medium stores one or more instructions for wireless communication, the one or more instructions, when executed by one or more processors of a UE, cause the UE to: transmit or receive a GTS indication relating to sidelink communication; and enter a sleep state based at least in part on the GTS indication.

In some aspects, an apparatus for wireless communication includes means for transmitting or receiving a GTS indication relating to sidelink communication; and means for entering a sleep state based at least in part on the GTS indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
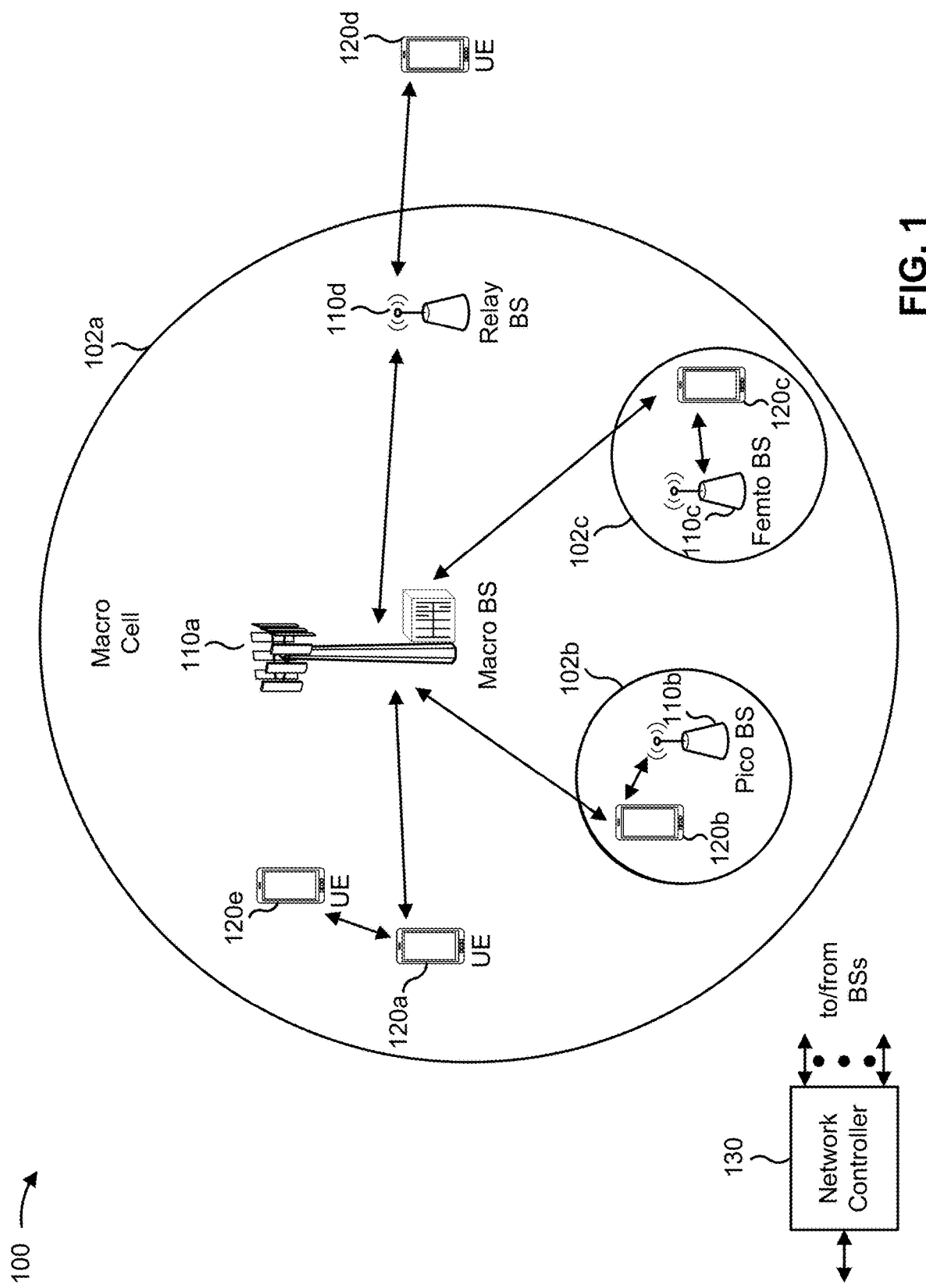
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) radio access network (RAN) Intelligent Controller (MC), or a Non-Real Time (Non-RT) MC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6

GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
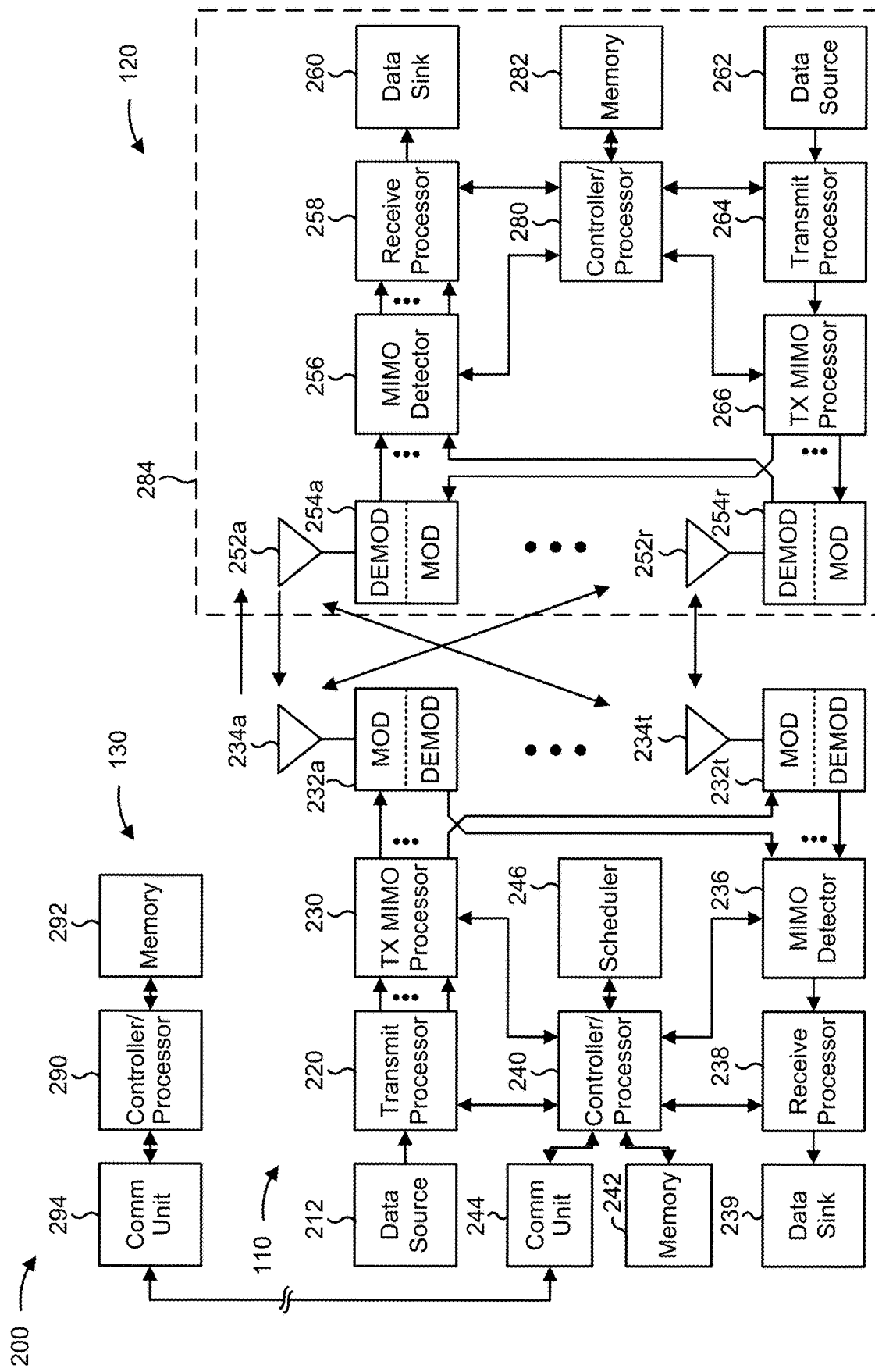
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-9).

Controller/processor 240 of base station 110, controller/processor 280 of UE 120, and/or any other component(s) of FIG. 2 may perform one or more techniques associated with sidelink go-to-sleep (GTS) indication, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, the UE includes means for transmitting or receiving a GTS indication relating to sidelink communication; and/or means for entering a sleep state based at least in part on the GTS indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting a request to receive the GTS indication. In some aspects, the UE includes means for receiving acknowledgment feedback for the request prior to receiving the GTS indication. In some aspects, the UE includes means for receiving acknowledgment feedback for the request; and/or means for initiating a timer for receiving the GTS indication. In some aspects, the UE includes means for transmitting, to another UE, a GTS indication based at least in part on a determination that the UE is not to transmit data to the other UE; and/or means for transmitting, to the other UE, a request to receive a GTS indication based at least in part on a determination that the UE is not to receive data from the other UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
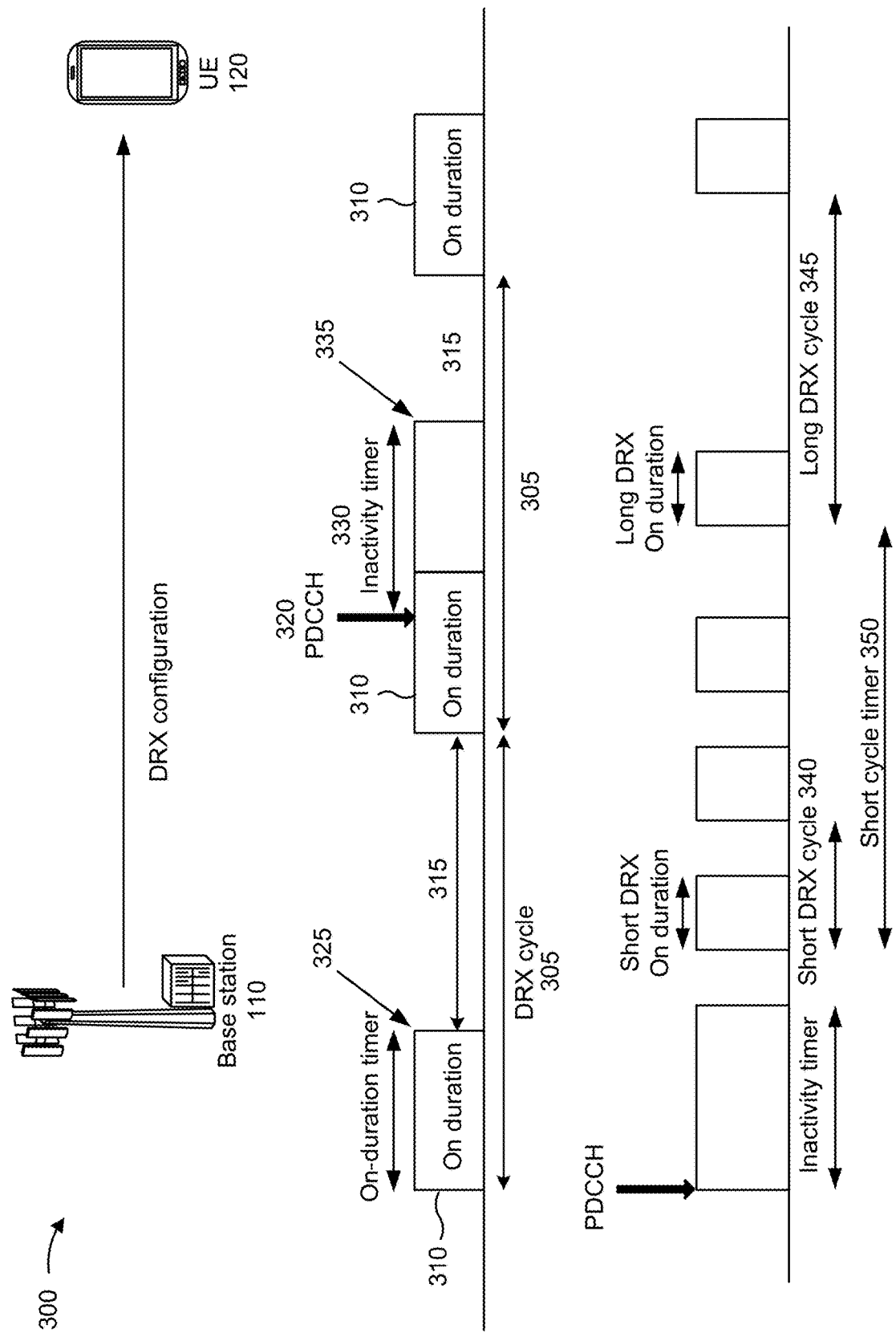
FIG. 3 is a diagram illustrating an example of a discontinuous reception (DRX) configuration, in accordance with the present disclosure.

FIG. 3 is a diagram illustrating an example 300 of a discontinuous reception (DRX) configuration, in accordance with the present disclosure.

As shown in FIG. 3, a base station 110 may transmit a DRX configuration to a UE 120 to configure a DRX cycle 305 for the UE 120 (e.g., NR supports DRX for power saving for access link communication). A DRX cycle 305 may include a DRX on duration 310 (e.g., during which a UE 120 is awake or in an active state) and an opportunity to enter a DRX sleep state 315 (or a sleep mode). As used herein, the time during which the UE 120 is configured to be in an active state during the DRX on duration 310 may be referred to as an active time or an active duration, and the time during which the UE 120 is configured to be in the DRX sleep state 315 may be referred to as an inactive time or an inactive duration. As described below, the UE 120 may monitor a physical downlink control channel (PDCCH) during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot or a subframe). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

In addition, as shown, the UE 120 may be configured to use a short DRX cycle 340 and a long DRX cycle 345. The long DRX cycle 345 may be associated with longer durations for which the UE 120 is in a sleep state, between DRX on durations, relative to the short DRX cycle 340. In some examples, the on durations for the short DRX cycle 340 and the long DRX cycle 345 may be the same duration. The UE 120 may be configured (e.g., with the parameter drxShort-CycleTimer) to use the short DRX cycle 340 until the expiration of a short cycle timer 350. After expiration of the short cycle timer 350, the UE 120 may switch to using the long DRX cycle 345.

As indicated above, FIG. 3 is provided as an example. Other examples may differ from what is described with respect to FIG. 3.

Figure 4:
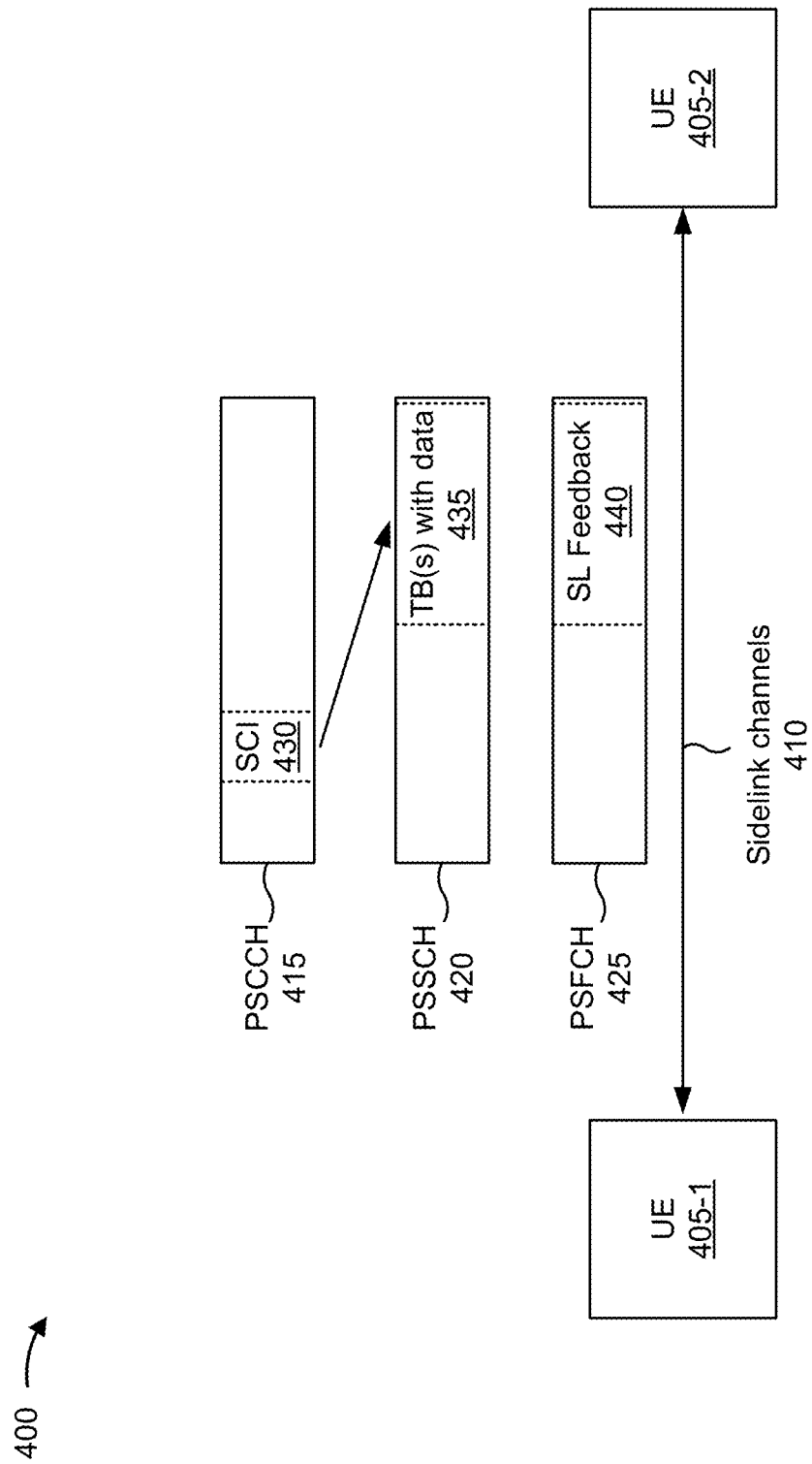
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications and/or V2I communications) and/or mesh networking. In some examples, the UEs 405 (e.g., UE 405-1 and/or UE 405-2) may correspond to one or more other UEs described elsewhere herein, such as UE 120. In some examples, the one or more sidelink channels 410 may use a PC5 interface and/or may operate in a high frequency band (e.g., the 5.9 GHz band). Additionally, or alternatively, the UEs 405 may synchronize timing of TTIs (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a PDCCH and/or a physical uplink control channel (PUCCH) used for cellular communications with a base station 110 via an access link or an access channel. The PSSCH 420 may be used to communicate data, similar to a PDSCH and/or a PUSCH used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request (SR).

In some examples, the one or more sidelink channels 410 may use resource pools. For example, a scheduling assignment (e.g., included in SCI 430) may be transmitted in sub-channels using specific resource blocks (RBs) across time. In some examples, data transmissions (e.g., on the PSSCH 420) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 405 may operate using a transmission mode where resource selection and/or scheduling is performed by a base station 110 (e.g., the base station 110 schedules sidelink communications in a PDCCH). This mode may be referred to as Mode 1. In some examples, a UE 405 may operate using a transmission mode where resource selection and/or scheduling is performed by the UE 405 (e.g., rather than a base station 110). This mode may be referred to as Mode 2.

In the transmission mode where resource selection and/or scheduling is performed by a UE 405, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some aspects, a UE 405 may use two-stage SCI, in which SCI is provided in a first stage and a second stage. The first stage may be referred to as SCI-1 and the second stage may be referred to as SCI-2. SCI-1 may be transmitted on a PSCCH. SCI-1 may indicate UE resource reservations. Additionally, or alternatively, SCI-1 may include a resource allocation and may include information for decoding SCI-2 (e.g., a format of SCI-2 and/or other information). The resource allocation may indicate resources for SCI-2. SCI-2 may be transmitted on a PSSCH. SCI-2 may include information for decoding a PSSCH.

As indicated above, FIG. 4 is provided as an example. Other examples may differ from what is described with respect to FIG. 4.

Figure 5:
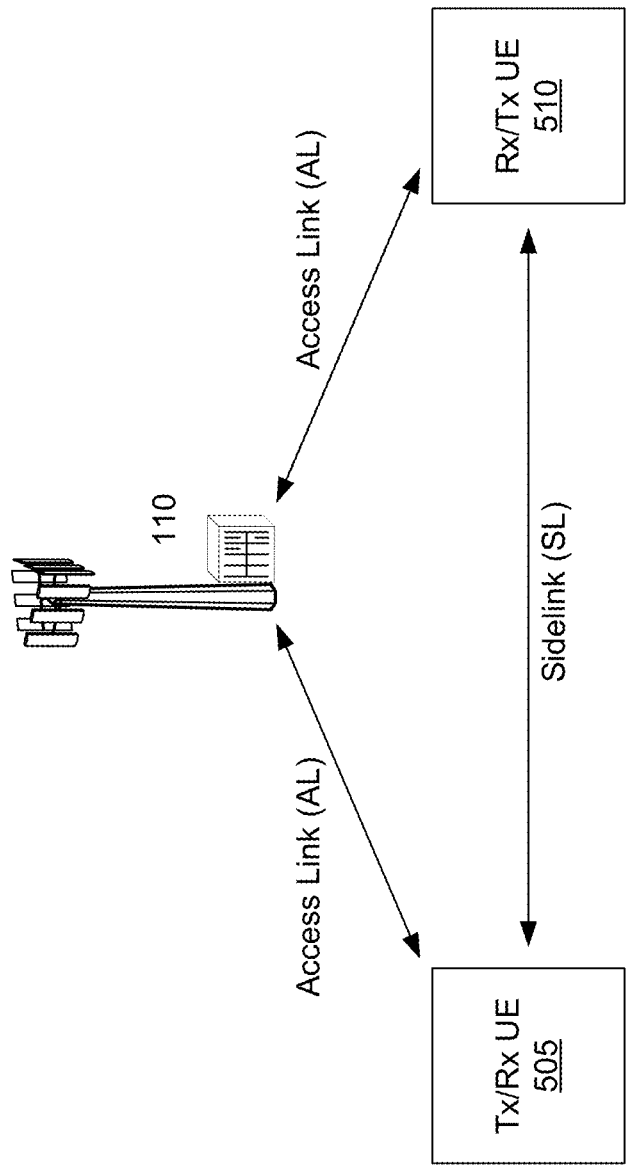
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
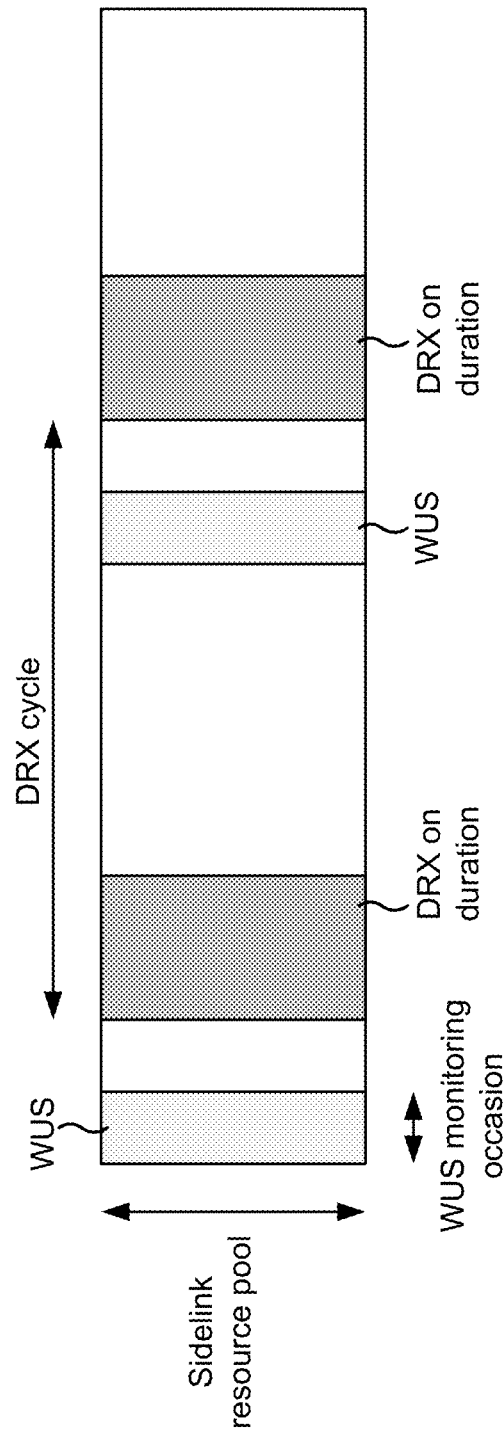
FIG. 6 is a diagram illustrating an example of a sidelink wakeup signal (WUS), in accordance with the present disclosure.

FIG. 6 is a diagram illustrating an example 600 of a sidelink wakeup signal (WUS), in accordance with the present disclosure.

DRX, as described above in connection with FIG. 3, may be supported for sidelink communication. For example, a UE, engaged in sidelink communication, may wake up during a DRX active duration, as described above. An inactivity timer, as described above, may be used to keep the UE awake (e.g., in an active state) outside of a configured DRX active duration (e.g., if a peer UE has additional transmissions for the UE). For example, if a non-zero inactivity timer is configured for the UE, and if the UE receives SCI that indicates resource reservations/transmissions outside of the UE's configured active duration, then the UE may extend the active duration (e.g., for the duration of the inactivity timer). Otherwise, the UE may go to sleep.

In addition, sidelink DRX may utilize a sidelink WUS. Here, the UE may temporarily transition out of a sleep state (e.g., by activating one or more modules and/or components, such as a baseband processor) during the UE's inactive time in order to monitor for a WUS during a time period (e.g., a WUS monitoring occasion, which is outside of a DRX active time). The WUS may indicate whether the UE is to wake up during the next DRX on duration. If the UE does not detect the presence of the WUS during the time period, the UE may return to the sleep state until the UE is to again monitor for the WUS. If the UE detects the presence of the WUS, the UE may transition to the active state (e.g., in a DRX on duration) in order to receive a sidelink communication (e.g., a PSCCH communication, a PSSCH communication, or the like).

In this way, the WUS enables the UE to refrain from waking during a DRX active time if there is no data for the UE to receive (e.g., the UE does not wake up unnecessarily). For example, if a first UE has data to transmit to a second UE, the first UE can transmit (e.g., in a WUS occasion associated with the first UE) an indication as a WUS to the second UE. Upon reception of the WUS, the second UE may wake and monitor sidelink resource pool resources for data.

In addition to a sidelink WUS, in some examples, a UE may transmit or receive a sidelink GTS indication (e.g., a GTS signal). A GTS indication may indicate whether a UE can go back to sleep after waking up. For example, a first UE may transmit a GTS indication to a second UE if the first UE has no more sidelink data for transmission to the second UE. A UE may monitor for a sidelink GTS indication during a sidelink DRX active time.

As indicated above, FIG. 6 is provided as an example. Other examples may differ from what is described with respect to FIG. 6.

In access link communication, a UE may use one or more schemes for power saving. In one example, the UE may use PDCCH skipping to conserve power. Here, a base station may indicate to the UE that the UE can skip monitoring a PDCCH for a particular time duration. Thus, during the time duration, the UE does not transmit or receive a dynamically granted channel. In another example, rather than skipping PDCCH monitoring, the base station may indicate to the UE that the UE can switch from a current search space to a new search space for PDCCH monitoring. Here, the new search space may be associated with a larger periodicity for PDCCH candidates relative to the current search space.

Sidelink communication, as described above, is widely used for various use cases, such as for communications involving smart wearable devices, IoT, reduced capability devices, and/or industrial IoT. Thus, power-efficient sidelink operation is important for extending the uptime of devices engaged in sidelink communication. However, sidelink communication lacks robust power-saving schemes, such as those described above for access link communication.

Some techniques and apparatuses described herein provide power-saving operations in sidelink. In some aspects, a UE may enter a sleep state based at least in part on receiving a GTS indication for sidelink. In some aspects, when entering the sleep state, the UE may refrain from monitoring a PSCCH and/or a PSSCH based at least in part on whether the UE has sidelink data to transmit and/or to receive. In some aspects, the UE may transmit a request to receive the GTS indication. In some aspects, the GTS indication may be bidirectional (e.g., indicating that the transmitting UE and the receiving UE of the GTS indication are to sleep) or unidirectional (e.g., indicating that the receiving UE of the GTS indication is to sleep). In this way, the UE does not stay awake unnecessarily, thereby conserving power at the UE, reducing a downtime of the UE, prolonging a time between charging of the UE, or the like.

Figure 7:
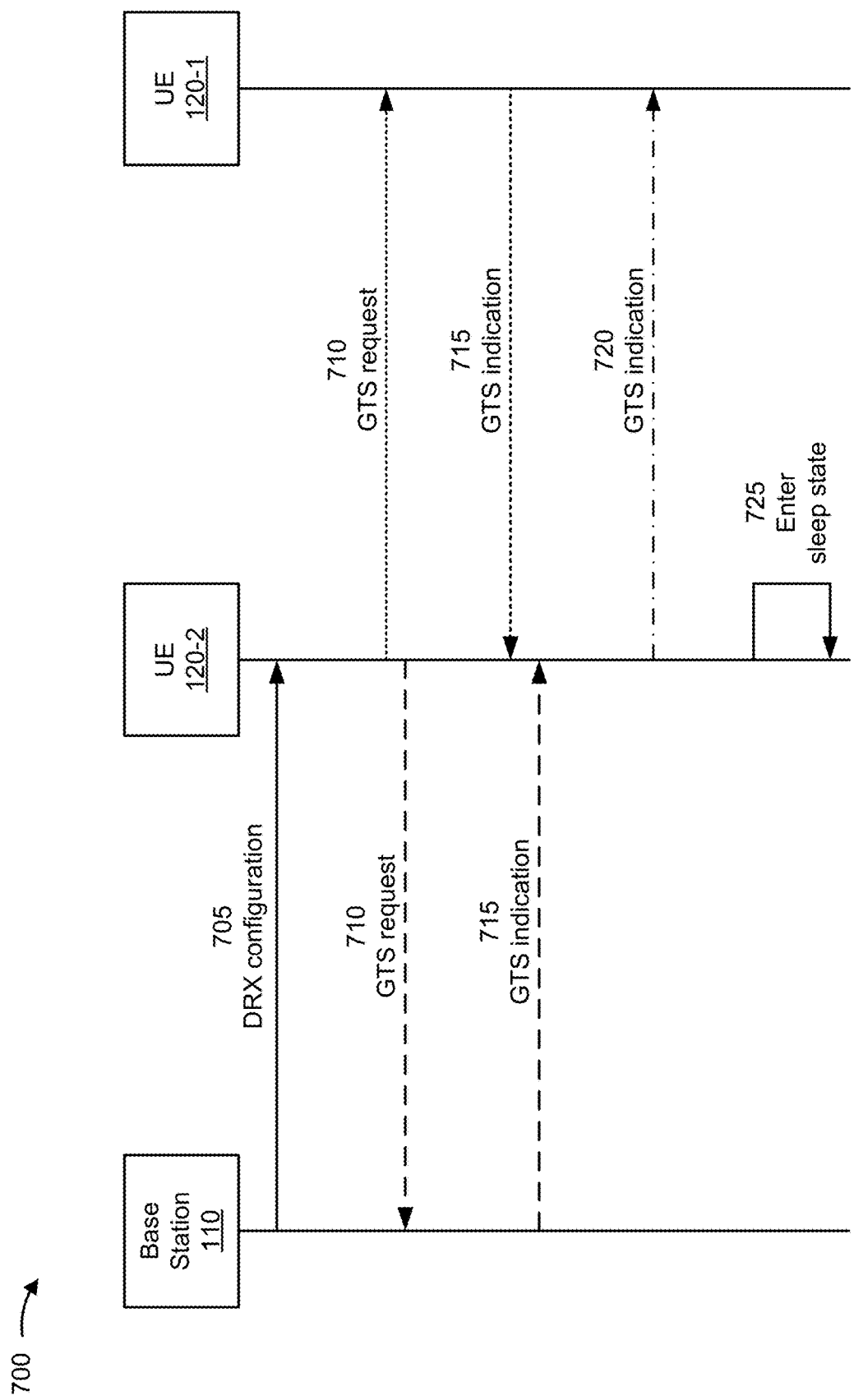
FIG. 7 is a diagram illustrating an example associated with sidelink go-to-sleep (GTS) indication, in accordance with the present disclosure.

FIG. 7 is a diagram illustrating an example 700 associated with sidelink GTS indication, in accordance with the present disclosure. As shown in FIG. 7, a first UE 120-1 and a second UE 120-2 may communicate with one another (e.g., via a sidelink) and/or a base station 110 and the second UE 120-2 may communicate with one another (e.g., via an access link). In some aspects, the base station 110, the first UE 120-1, and/or the second UE 120-2 may be included in a wireless network, such as wireless network 100. In some aspects, the first UE 120-1 and the second UE 120-2 may be included in a wireless sidelink network, such as an ad hoc network.

As shown by reference number 705, the base station 110 may transmit, and the second UE 120-2 may receive, a DRX configuration. The DRX configuration may be for sidelink DRX, as described above. For example, the sidelink DRX configuration may configure an on duration, an inactivity timer, a DRX cycle, or the like, as described above. In some aspects, the sidelink DRX configuration, or another configuration, may configure a sidelink WUS (e.g., locations of WUS monitoring occasions) for sidelink DRX. In some aspects, the second UE 120-2 may receive the DRX configuration (and/or the other configuration) from the first UE 120-1.

The second UE 120-2 may perform a DRX operation based at least in part on the DRX configuration (and/or the other configuration). For example, the second UE 120-2 may transition between an awake state (e.g., an active state) and a sleep state (e.g., an inactive state) in accordance with the DRX configuration (and/or the other configuration). "Sleep state" may refer to a state of a UE with a particular group of parameters set for the UE, such as parameters set to have an antenna panel powered off, have circuitry associated with an antenna panel powered off, have circuitry associated with monitoring signals received at an antenna panel powered off, have receive power reduced relative to a non-sleep state (e.g., an awake state), refrain from monitoring for received signals, deactivate one or more component carriers, or the like.

As shown by reference number 710, the second UE 120-2 may transmit a GTS request. The GTS request may relate to sidelink communication of the second UE 120-2. For example, the GTS request may relate to one or more sidelinks (e.g., one or more sidelink sessions, each associated with a different source identifier and/or destination identifier, as described below) of the second UE 120-2 with one or more other UEs (e.g., the first UE 120-1). The second UE 120-2 may transmit the GTS request during a sidelink DRX active time of a sidelink DRX operation performed by the second UE 120-2 (e.g., in accordance with the DRX configuration). However, in some aspects, the second UE 120-2 may transmit the GTS request during another time period and/or regardless of whether DRX is configured for the second UE 120-2.

The second UE 120-2 may transmit the GTS request to the first UE 120-1 (e.g., the first UE 120-1 may receive the GTS request) and/or to the base station 110 (e.g., the base station 110 may receive the GTS request). The GTS request may be a request for the second UE 120-2 to receive a GTS indication (e.g., a GTS signal) relating to sidelink communication. That is, the second UE 120-2 may request that the first UE 120-1 and/or the base station 110 initiate a GTS procedure for sidelink.

In some aspects, the second UE 120-2 may transmit the GTS request based at least in part on a determination that a battery level of the second UE 120-2 is below a threshold value (e.g., the second UE 120-2 has limited battery remaining). In some aspects, the second UE 120-2 may transmit the GTS request based at least in part on a determination that the second UE 120-2 received an access link (Uu) GTS indication. That is, if the second UE 120-2 is engaged in access link (Uu) communication and sidelink communication, and if the second UE 120-2 received an access link GTS indication (e.g., indicating that the second UE 120-2 is to sleep), then the second UE 120-2 may nonetheless remain in an active state (e.g., maintain an RF chain in an on state) unless the second UE 120-2 also receives a sidelink GTS indication.

In some aspects, the GTS request may indicate (e.g., using only a single bit) a request to receive a GTS indication (e.g., the GTS request may be binary). Additionally, or alternatively, the GTS request may indicate a time duration for which the second UE 120-2 is requesting to sleep.

In some aspects, the time duration may be a remaining portion of the DRX active time in which the GTS request is transmitted and/or a responsive GTS indication is received (that is, the current DRX active time). For example, the responsive GTS indication may indicate that the second UE 120-2 is to skip the remaining portion of the current DRX active time, and that the second UE 120-2 is to operate in a sleep state until the next DRX active time. In some aspects, the time duration may be a quantity of time intervals (e.g., slots) of the current DRX active time. For example, the responsive GTS indication may indicate that the second UE 120-2 is to skip (e.g., operate in a sleep state for) a portion of time intervals (e.g., slots) in the current DRX active time. The time intervals may be consecutive or non-consecutive. In some aspects, the time duration may be multiple DRX active times. For example, the responsive GTS indication may indicate a quantity of DRX active times that the second UE 120-2 is to skip (e.g., operate in a sleep state).

In some aspects, the GTS request may indicate a request to sleep for the time duration indicated by a semi-static configuration (e.g., a radio resource control (RRC) configuration) of the second UE 120-2 and/or indicated by a fixed rule (e.g., a rule indicating that the second UE 120-2 is to wake up for the next DRX cycle, or a rule indicating any of the other time durations described above). For example, the responsive GTS indication may indicate only whether the second UE 120-2 is to receive sidelink data (e.g., a single-bit indication), and the second UE 120-2 may determine the time duration in accordance with the semi-static configuration and/or the rule. In some aspects, the semi-static configuration and/or the rule is particular to a sidelink resource pool in which the second UE 120-2 is communicating (e.g., different sidelink resource pools may be associated with different configurations and/or rules). In some aspects, the GTS request may indicate a request to sleep until a next WUS monitoring occasion of the DRX operation.

In some aspects, the GTS request may be a sequence-based request. That is, the GTS request transmitted by the second UE 120-2 may be carried by a sequence. In some aspects, particular time and frequency resources in a sidelink resource pool may be allocated for the transmission and/or reception of the GTS request. Occasions for transmitting and/or monitoring for the GTS request (e.g., the particular time and frequency resources) may be based at least in part on (e.g., dependent upon) a source identifier associated with the GTS request (e.g., an identifier of the second UE 120-2), a destination identifier associated with the GTS request (e.g., an identifier of the first UE 120-1), a cast type (e.g., unicast, groupcast, broadcast, or the like) associated with the GTS request, and/or a zone identifier (e.g., that identifies a geographic area) associated with the first UE 120-1 and/or the second UE 120-2.

In some aspects, the GTS request may be indicated by the sequence. For example, the particular request indicated by the GTS request (e.g., the time duration for which the second UE 120-2 is requesting to sleep, or the like) may be indicated by the sequence. In some aspects, the particular request indicated by the GTS request, or a portion thereof, may be implied by the transmission of the sequence. For example, the particular request, or the portion thereof, may be a function of a time interval (e.g., a slot) used for transmitting the GTS request.

In some aspects, the GTS request may be indicated in a communication of a PSCCH or a PSSCH (e.g., the GTS request may be PSCCH-based and/or PSSCH-based). For example, the GTS request may be included in SCI, such as SCI-1 (e.g., transmitted in a PSCCH) or SCI-2 (e.g., transmitted in a PSSCH), or included in a medium access control control element (MAC-CE) (e.g., transmitted in a PSSCH). As an example, a data transmission from the second UE 120-2 to the first UE 120-1 may additionally include the GTS request.

In some aspects, the GTS request may identify a source identifier (e.g., a source UE sidelink identifier) associated with the GTS request and/or a destination identifier (e.g., a destination UE sidelink identifier) associated with the GTS request. The source identifier may be associated with the UE transmitting the GTS request (e.g., the second UE 120-2), and the destination identifier may be associated with the UE receiving the GTS request (e.g., the first UE 120-1). In sidelink, communications across UEs are identified by source and destination identifiers. Moreover, source and destination identifiers may be specific to a particular link (that is, a particular sidelink session). For example, the first UE 120-1 and the second UE 120-2 may be engaged in communication via two different applications, each application associated with a respective link/sidelink session, and the source and destination identifiers used for the first UE 120-1 and the second UE 120-2 may be different for the respective links/sidelink sessions.

As shown by reference number 715, the second UE 120-2 may receive a GTS indication. For example, if the GTS request is transmitted to the first UE 120-1, the first UE 120-1 may transmit the GTS indication to the second UE 120-2 in response to the GTS request. As another example, if the GTS request is transmitted to base station 110, the base station 110 may transmit the GTS indication to the second UE 120-2 in response to the GTS request. In some aspects, the second UE 120-2 may receive the GTS indication from the first UE 120-1 and/or the base station 110 without transmitting the GTS request (e.g., the first UE 120-1 and/or the base station 110 may initiate the GTS procedure without receiving a GTS request from the second UE 120-2). In some aspects, the second UE 120-2 may receive the GTS indication during a sidelink DRX active time of a sidelink DRX operation performed by the second UE 120-2, as described above. However, in some aspects, the second UE 120-2 may receive the GTS indication during another time period and/or regardless of whether DRX is configured for the second UE 120-2.

The GTS indication may indicate that the second UE 120-2 is not to receive sidelink data (e.g., there is no more sidelink data that the second UE 120-2 is going to receive from another UE, such as the first UE 120-1). Accordingly, the GTS indication may indicate that the second UE 120-2 may go to sleep (e.g., enter a sleep state). That is, the GTS indication may indicate that the second UE 120-2 may refrain from monitoring a PSCCH and/or PSSCH.

In some aspects, the GTS indication may indicate (e.g., using a single bit) whether the second UE 120-2 may go to sleep (e.g., indicate whether the second UE 120-2 is to receive sidelink data). Here, the GTS indication may imply that a time duration for which the second UE 120-2 is to sleep is the time duration indicated in the GTS request. Additionally, or alternatively, the GTS indication may indicate a time duration for which the second UE 120-2 is to sleep. For example, the GTS indication may indicate the time duration requested in the GTS request or another time duration. In some aspects, the GTS indication may be sequence-based, PSCCH-based, or PSSCH-based, in a similar manner as described above. In some aspects, the GTS indication may include at least one of a source identifier associated with the GTS indication or a destination identifier associated with the GTS indication, in a similar manner as described above.

In some aspects, the GTS indication may indicate that another UE (e.g., the first UE 120-1) is not to transmit data to the second UE 120-2 (e.g., the other UE has no sidelink data for transmission to the second UE 120-2) and that the other UE is not to receive data from the second UE 120-2 (e.g., a request that the second UE 120-2 refrain from transmitting sidelink data to the other UE). That is, GTS signaling may be bidirectional and may indicate, for example, that the first UE 120-1 does not have data for transmission to the second UE 120-2 and also that the first UE 120-1 will not receive data from the second UE 120-2 (e.g., an initiation of GTS and a GTS command may be transmitted together). In some aspects, the GTS request may be bidirectional, in a similar manner as described above.

In some aspects, the second UE 120-2 may receive the GTS indication from the first UE 120-1, and the second UE 120-2 may receive (e.g., separately) a GTS request from the first UE 120-1. That is, GTS signaling may be unidirectional. Thus, a UE may transmit a GTS indication if the UE determines that the UE does not have data to transmit to another UE, and the UE may transmit (e.g., separately) a GTS request if the UE determines that the UE is to go to sleep. For example, the second UE 120-2 may transmit the GTS request, as described above, to the first UE 120-1 based at least in part on a determination that the second UE 120-2 is not to receive data from the first UE 120-1 (e.g., the second UE 120-2 determined that the second UE 120-2 is to sleep). Additionally, or alternatively, the second UE 120-2 may transmit a GTS indication to the first UE 120-1 based at least in part on a determination that the second UE 120-2 is not to transmit data to the first UE 120-1 (e.g., the second UE 120-2 has no sidelink data for transmission to the first UE 120-1).

In some aspects, a GTS message (e.g., a GTS request and/or a GTS indication) may indicate (e.g., dynamically) whether the GTS message is associated with unidirectional GTS (e.g., the GTS message indicates that a UE is not to transmit sidelink data or that the UE is not to receive sidelink data, but not both) or bidirectional GTS (e.g., the GTS message indicates both that a UE is not to transmit sidelink data and that the UE is not to receive sidelink data). In some aspects, whether a GTS message is associated with unidirectional GTS or bidirectional GTS may be semi-statically configured across sidelink UEs (e.g., the first UE 120-1 and the second UE 120-2). For example, the base station 110 may transmit a configuration (e.g., an RRC configuration) for whether GTS messages are associated with unidirectional GTS or bidirectional GTS. In some aspects, whether a GTS message is associated with unidirectional GTS or bidirectional GTS may be based at least in part on a sidelink resource pool in which the GTS message is transmitted (e.g., whether a GTS message is associated with unidirectional GTS or bidirectional GTS may be resource pool specific). For example, a first GTS message associated with a first sidelink resource pool may be unidirectional, and a second GTS message associated with a second sidelink resource pool may be bidirectional.

In some aspects, the GTS indication received by the second UE 120-2 from the first UE 120-1 may include a first bit and a second bit. In some aspects, the first bit may indicate whether the second UE 120-2 is to sleep (e.g., the first bit may be used to request the second UE 120-2 to sleep). In some aspects, the second bit may indicate whether the first UE 120-1 is to sleep (e.g., the second bit may be used to announce that the first UE 120-1 is to sleep). In other words, the first bit may indicate whether the receiving UE of the GTS indication is to sleep, and the second bit may indicate whether the transmitting UE of the GTS indication is to sleep.

Based at least in part on which of the first bit and the second bit are set (e.g., to a value of 1), the first UE 120-1 and the second UE 120-2 may determine a respective sleep operation for the first UE 120-1 and the second UE 120-2. Thus, if only one of the bits is set, the GTS indication may be considered unidirectional GTS, and if both of the bits are set, the GTS indication may be considered bidirectional GTS. In some aspects, the GTS request may include a first bit and a second bit, in a similar manner as described above.

In some aspects, the GTS indication may be indicated by HARQ ACK/NACK feedback for the GTS request. That is, the first UE 120-1 and/or the base station 110 may transmit, and the second UE 120-2 may receive, ACK/NACK feedback for the GTS request, rather than transmitting a separate GTS message, to provide the GTS indication. For example, the first UE 120-1 and/or the base station 110 may transmit acknowledgment (ACK) feedback (e.g., in a single bit) for the GTS request to indicate that the second UE 120-2 is to go to sleep. As another example, the first UE 120-1 and/or the base station 110 may transmit negative ACK (NACK) feedback (e.g., in a single bit) for the GTS request to indicate that the second UE 120-2 is not to go to sleep. In other words, NACK feedback for the GTS request may indicate that the GTS request is not granted.

In some aspects, the first UE 120-1 and/or the base station 110 may transmit, and the second UE 120-2 may receive, ACK feedback for the GTS request to merely indicate successful reception of the GTS request. Here, the first UE 120-1 and/or the base station 110 may separately transmit the GTS indication (e.g., based at least in part on a determination that the second UE 120-2 is to sleep). In some aspects, the second UE 120-2 may not receive ACK feedback for the GTS request, and the second UE 120-2 may retransmit the GTS request.

In some aspects, the second UE 120-2 may receive ACK feedback for the GTS request (e.g., prior to receiving the GTS indication), and the second UE 120-2 may initiate monitoring for the GTS indication. In some aspects, the second UE 120-2 may receive ACK feedback for the GTS request, and the second UE 120-2 may initiate, based at least in part on receiving the ACK feedback (e.g., upon receiving the ACK feedback), a timer for receiving the GTS indication. While the timer is running, the second UE 120-2 may wait to receive the GTS indication. Upon expiration of the timer, if the second UE 120-2 has not received the GTS indication, the second UE 120-2 may retransmit the GTS request.

As shown by reference number 720, the second UE 120-2 may transmit, and the first UE 120-1 may receive, a different GTS indication (e.g., a different GTS signal). The second UE 120-2 may transmit the different GTS indication without transmitting the GTS request and without receiving the GTS indication, as described above. In other words, the second UE 120-2 may initiate the GTS procedure by transmitting the different GTS indication and without transmitting the GTS request or receiving the GTS indication. In some aspects, the second UE 120-2 may transmit the different GTS indication to the base station 110, and the base station 110 may transmit information to the first UE 120-1 indicative of the different GTS indication.

The different GTS indication may indicate that the UE is to sleep and is not to receive sidelink data (e.g., from the first UE 120-1). The different GTS indication may indicate a time duration for which the second UE 120-2 is to sleep, in a similar manner as described above. In some aspects, the different GTS indication may be sequence-based, PSCCH-based, or PSSCH-based, in a similar manner as described above. In some aspects, the different GTS indication may include at least one of a source identifier associated with the different GTS indication or a destination identifier associated with the different GTS indication, in a similar manner as described above.

As shown by reference number 725, the second UE 120-2 may enter a sleep state (e.g., transition from an active state to a sleep state). For example, the second UE 120-2 may enter the sleep state based at least in part on receiving the GTS indication from first UE 120-1 or the base station 110. As another example, the second UE 120-2 may enter the sleep state based at least in part on transmitting the different GTS indication. In the sleep state, the second UE 120-2 may refrain from monitoring a PSCCH and/or a PSSCH. In this way, the second UE 120-2 may reduce power consumption. The second UE 120-2 may remain in the sleep state for the time duration associated with the GTS request, the GTS indication, or the different GTS indication, as described above. Thus, the second UE 120-2 may transition from the sleep state to the active state upon expiration of the time duration.

In some aspects, the second UE 120-2 may be operating in sidelink Mode 1 (e.g., resource selection is performed by the base station 110) or Mode 2 (e.g., resource selection is performed by UEs), as described above. In some aspects, the second UE 120-2 may be a receive-only UE (e.g., except for PSFCH transmissions and/or synchronization signal block (SSB) transmissions). That is, the second UE 120-2, either by capability or configuration/indication, does not transmit sidelink data (e.g., in a PSCCH or a PSSCH). In some other aspects, the second UE 120-2 may be capable of transmitting, and/or may have sidelink data for transmission (e.g., to the first UE 120-1), in addition to receiving sidelink data.

In some aspects, the second UE 120-2 may be operating in sidelink Mode 1 (e.g., sidelink resources are allocated by the base station 110). Here, in the sleep state, the second UE 120-2 may refrain from monitoring both a PSCCH for first stage SCI (e.g., because sidelink resources are allocated via PDCCH) and a PSSCH for second stage SCI. The second UE 120-2 may refrain from monitoring a PSCCH and a PSSCH for the time duration (e.g., indicated by the GTS indication).

In some aspects, the second UE 120-2 may be operating in sidelink Mode 2 (e.g., sidelink resources are selected and reserved by UEs), and the second UE 120-2 is not to transmit sidelink data (e.g., the second UE 120-2 is a receive-only UE, as described above). Here, in the sleep state, the second UE 120-2 may refrain from monitoring both a PSCCH for first stage SCI and a PSSCH for second stage SCI. The second UE 120-2 may refrain from monitoring a PSCCH and a PSSCH for the time duration (e.g., indicated by the GTS indication).

In some aspects, the second UE 120-2 may be operating in sidelink Mode 2, and the second UE 120-2 is to transmit sidelink data (e.g., the second UE 120-2 has sidelink data for transmission to another UE, such as the first UE 120-1). In this scenario, the second UE 120-2 does not expect to receive sidelink data from the first UE 120-1 (e.g., in accordance with the GTS indication), and therefore, the second UE 120-2 does not need to decode second stage SCI (e.g., which includes information relating to the source identifier and the destination identifier, which is not needed by the second UE 120-2 in this scenario). However, to enable resource reservation (e.g., for transmitting the sidelink data) in this scenario, the second UE 120-2 may need to decode first stage SCI, which includes resource reservation information associated with other UEs. Accordingly, in this scenario in the sleep state, the second UE 120-2 may monitor a PSCCH for first stage SCI and refrain from monitoring a PSSCH and/or for second stage SCI. In other words, in Mode 2, if a UE is capable of transmitting, or has for transmission, sidelink data, the UE decodes first stage SCI even if the UE has received a GTS indication.

In some aspects, the second UE 120-2 may decode first stage SCI at a beginning portion of a slot (e.g., in a first symbol of the slot, in a first two symbols of the slot, or the like). Accordingly, upon decoding the first stage SCI, the second UE 120-2 may operate in the sleep state until the beginning of the next slot.

In some aspects, the second UE 120-2 may be associated with a plurality of sidelink sessions. Here, the GTS indication or the different GTS indication may be associated with a sidelink session of the plurality of sidelink sessions. In some aspects, the second UE 120-2 may enter the sleep state based at least in part on a determination that the second UE 120-2 received (e.g., in the current DRX active time) a GTS indication for each link/sidelink session of the second UE 120-2 (e.g., the second UE 120-2 may enter the sleep state based at least in part on a determination that each of the plurality of sidelink sessions is associated with a respective GTS indication). That is, the second UE 120-2 may refrain from entering the sleep state (even if a GTS indication is received for a subset of the sessions) if the second UE 120-2 did not receive (e.g., in the current DRX active time) a GTS indication for at least one link/sidelink session of the second UE 120-2. Here, the second UE 120-2 may remain in an active state in order to monitor resources and receive data.

In some aspects, the plurality of sidelink sessions may include one or more unicast sessions, one or more groupcast sessions, and/or one or more broadcast sessions. However, GTS indication/operation may be suitable only for particular cast types in which identities of member UEs are known (e.g., unicast or managed groupcast). Thus, support of GTS indication/operation by the second UE 120-2 may be cast-type dependent. For example, the second UE 120-2 may be enabled to support GTS indication for a first cast type (e.g., unicast), and the second UE 120-2 may not be enabled to support GTS indication for a second cast type (e.g., broadcast).

As indicated above, FIG. 7 is provided as an example. Other examples may differ from what is described with respect to FIG. 7.

Figure 8:
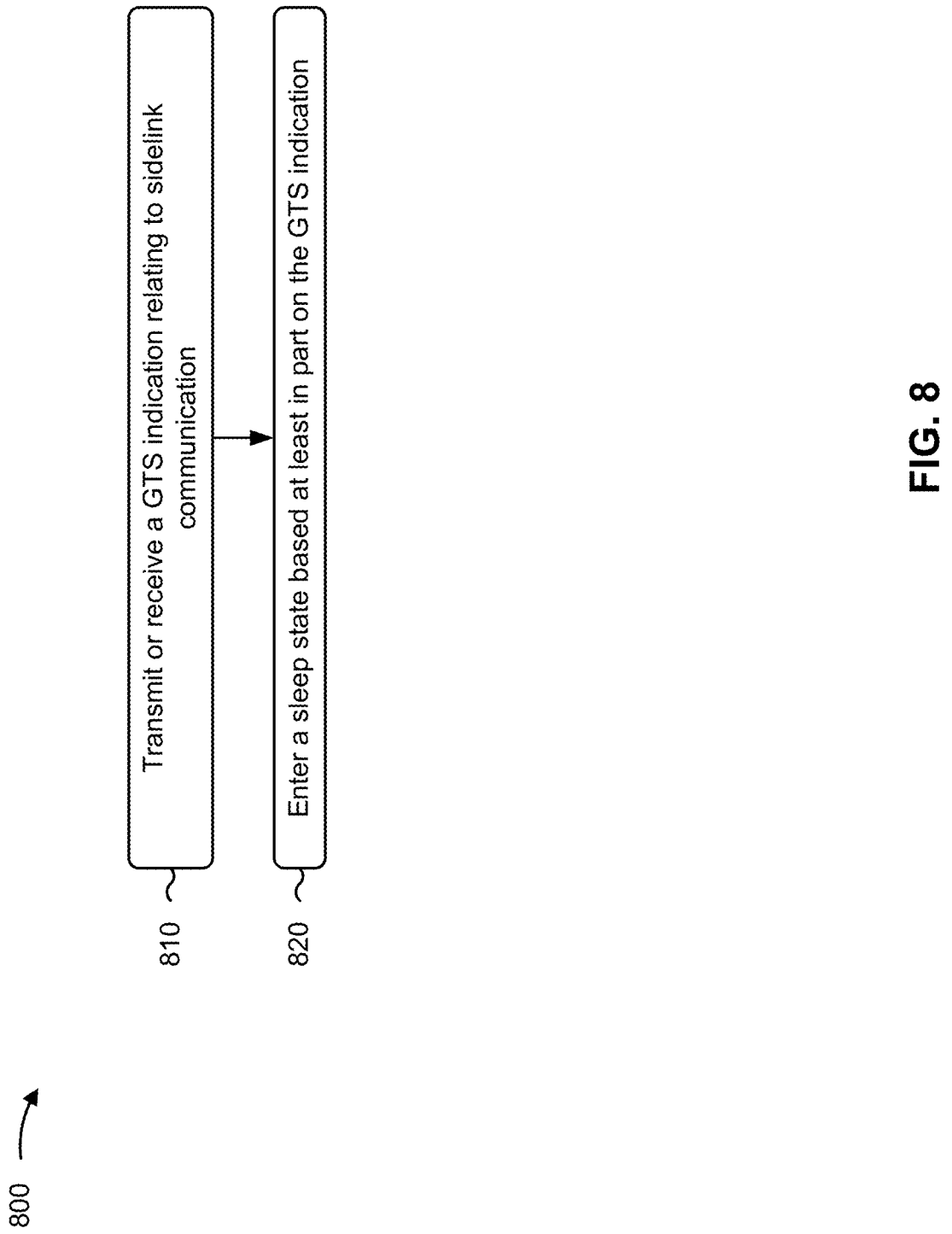
FIG. 8 is a diagram illustrating an example process associated with sidelink GTS indication, in accordance with the present disclosure.

FIG. 8 is a diagram illustrating an example process 800 performed, for example, by a UE, in accordance with the present disclosure. Example process 800 is an example where the UE (e.g., UE 120) performs operations associated with sidelink GTS indication.

As shown in FIG. 8, in some aspects, process 800 may include transmitting or receiving a GTS indication relating to sidelink communication (block 810). For example, the UE (e.g., using transmission component 904 or reception component 902, depicted in FIG. 9) may transmit or receive a GTS indication relating to sidelink communication, as described above.

As further shown in FIG. 8, in some aspects, process 800 may include entering a sleep state based at least in part on the GTS indication (block 820). For example, the UE (e.g., using monitoring component 908, depicted in FIG. 9) may enter a sleep state based at least in part on the GTS indication, as described above.

Process 800 may include additional aspects, such as any single aspect or any combination of aspects described below and/or in connection with one or more other processes described elsewhere herein.

In a first aspect, the GTS indication is transmitted or received during an active duration of a sidelink DRX operation.

In a second aspect, alone or in combination with the first aspect, the GTS indication is received from another UE or a base station.

In a third aspect, alone or in combination with one or more of the first and second aspects, the GTS indication identifies at least one of a source identifier or a destination identifier associated with the GTS indication.

In a fourth aspect, alone or in combination with one or more of the first through third aspects, the GTS indication indicates that the UE is not to receive data from another UE.

In a fifth aspect, alone or in combination with one or more of the first through fourth aspects, the UE is in a sidelink mode in which UEs perform resource selection, the UE is not to transmit sidelink data, and entering the sleep state includes refraining from monitoring both a physical sidelink control channel and a physical sidelink shared channel.

In a sixth aspect, alone or in combination with one or more of the first through fifth aspects, the UE is in a sidelink mode in which UEs perform resource selection, the UE is to transmit sidelink data, and entering the sleep state includes monitoring a physical sidelink control channel for first stage sidelink control information and refraining from monitoring a physical sidelink shared channel for second stage sidelink control information.

In a seventh aspect, alone or in combination with one or more of the first through sixth aspects, the UE is in a sidelink mode in which a base station performs resource allocation, and entering the sleep state comprises refraining from monitoring both a physical sidelink control channel and a physical sidelink shared channel.

In an eighth aspect, alone or in combination with one or more of the first through seventh aspects, the GTS indication is associated with a sidelink session, of a plurality of sidelink sessions, of the UE, and the sleep state is entered based at least in part on a determination that each of the plurality of sidelink sessions is associated with a respective GTS indication.

In a ninth aspect, alone or in combination with one or more of the first through eighth aspects, the UE is enabled to support GTS indication for a first cast type, and the UE is not enabled to support GTS indication for a second cast type.

In a tenth aspect, alone or in combination with one or more of the first through ninth aspects, process 800 includes transmitting a request to receive the GTS indication.

In an eleventh aspect, alone or in combination with one or more of the first through tenth aspects, the request indicates a duration for which the UE is to sleep.

In a twelfth aspect, alone or in combination with one or more of the first through eleventh aspects, the request is a sequence-based request.

In a thirteenth aspect, alone or in combination with one or more of the first through twelfth aspects, the request is indicated in a communication of a physical sidelink control channel or a physical sidelink shared channel.

In a fourteenth aspect, alone or in combination with one or more of the first through thirteenth aspects, the GTS indication is indicated by acknowledgment feedback for the request.

In a fifteenth aspect, alone or in combination with one or more of the first through fourteenth aspects, process 800 includes receiving acknowledgment feedback for the request prior to receiving the GTS indication.

In a sixteenth aspect, alone or in combination with one or more of the first through fifteenth aspects, process 800 includes receiving acknowledgment feedback for the request, and initiating a timer for receiving the GTS indication.

In a seventeenth aspect, alone or in combination with one or more of the first through sixteenth aspects, process 800 includes transmitting, to another UE, an additional GTS indication based at least in part on a determination that the UE is not to transmit data to the other UE, and transmitting, to the other UE, a request to receive the GTS indication based at least in part on a determination that the UE is not to receive data from the other UE.

In an eighteenth aspect, alone or in combination with one or more of the first through seventeenth aspects, the GTS indication that is received indicates that another UE is not to transmit data to the UE and is not to receive data from the UE.

In a nineteenth aspect, alone or in combination with one or more of the first through eighteenth aspects, the GTS indication is received from another UE, and wherein the GTS indication includes a first bit indicating whether the UE is to sleep and a second bit indicating whether the other UE is to sleep.

In a twentieth aspect, alone or in combination with one or more of the first through nineteenth aspects, the GTS indication that is transmitted indicates that the UE is to sleep and is not to receive data.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
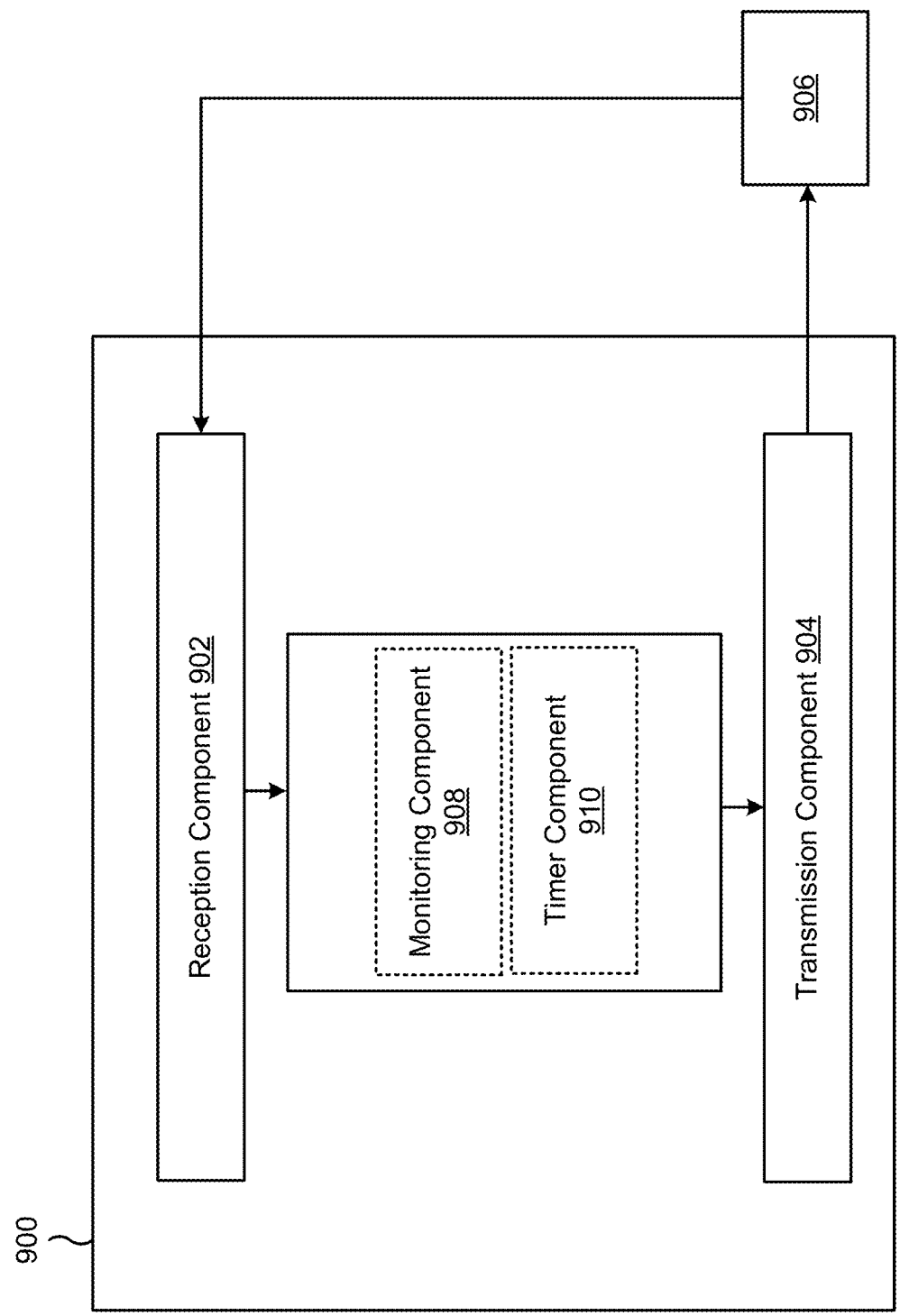
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a monitoring component 908 or a timer component 910, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a GTS indication relating to sidelink communication. The transmission component 904 may transmit a GTS indication relating to sidelink communication. The monitoring component 908 may enter a sleep state based at least in part on the GTS indication. For example, the monitoring component 908 may refrain from monitoring a PSCCH and/or a PSSCH, as described above.

The transmission component 904 may transmit a request to receive the GTS indication. The reception component 902 may receive acknowledgment feedback for the request prior to receiving the GTS indication. The reception component 902 may receive acknowledgment feedback for the request. The timer component 910 may initiate a timer for receiving the GTS indication. The transmission component 904 may transmit, to another UE, an additional GTS indication based at least in part on a determination that the UE is not to transmit data to the other UE. The transmission component 904 may transmit, to the other UE, a request to receive the GTS indication based at least in part on a determination that the UE is not to receive data from the other UE.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting or receiving a go-to-sleep (GTS) indication relating to sidelink communication; and entering a sleep state based at least in part on the GTS indication.

Aspect 2: The method of Aspect 1, wherein the GTS indication is transmitted or received during an active duration of a sidelink discontinuous reception (DRX) operation.

Aspect 3: The method of any of Aspects 1-2, wherein the GTS indication is received from another UE or a network entity.

Aspect 4: The method of any of Aspects 1-3, wherein the GTS indication identifies at least one of a source identifier or a destination identifier associated with the GTS indication.

Aspect 5: The method of any of Aspects 1-4, wherein the GTS indication indicates that the UE is not to receive data from another UE.

Aspect 6: The method of any of Aspects 1-5, wherein the UE is in a sidelink mode in which UEs perform resource selection, and the UE is not to transmit sidelink data, and wherein entering the sleep state comprises refraining from monitoring both a physical sidelink control channel and a physical sidelink shared channel.

Aspect 7: The method of any of Aspects 1-5, wherein the UE is in a sidelink mode in which UEs perform resource selection, and the UE is to transmit sidelink data, and wherein entering the sleep state comprises monitoring a physical sidelink control channel for first stage sidelink control information and refraining from monitoring a physical sidelink shared channel for second stage sidelink control information.

Aspect 8: The method of any of Aspects 1-5, wherein the UE is in a sidelink mode in which a network entity performs resource allocation, and wherein entering the sleep state comprises refraining from monitoring both a physical sidelink control channel and a physical sidelink shared channel.

Aspect 9: The method of any of Aspects 1-8, wherein the GTS indication is associated with a sidelink session, of a plurality of sidelink sessions, of the UE, and wherein the sleep state is entered based at least in part on a determination that each of the plurality of sidelink sessions is associated with a respective GTS indication.

Aspect 10: The method of any of Aspects 1-9, wherein the UE is enabled to support GTS indication for a first cast type, and the UE is not enabled to support GTS indication for a second cast type.

Aspect 11: The method of any of Aspects 1-10, further comprising: transmitting a request to receive the GTS indication.

Aspect 12: The method of Aspect 11, wherein the request indicates a duration for which the UE is to sleep.

Aspect 13: The method of any of Aspects 11-12, wherein the request is a sequence-based request.

Aspect 14: The method of any of Aspects 11-12, wherein the request is indicated in a communication of a physical sidelink control channel or a physical sidelink shared channel.

Aspect 15: The method of any of Aspects 11-14, wherein the GTS indication is indicated by acknowledgment feedback for the request.

Aspect 16: The method of any of Aspects 11-14, further comprising: receiving acknowledgment feedback for the request prior to receiving the GTS indication.

Aspect 17: The method of any of Aspects 11-14 or 16, further comprising: receiving acknowledgment feedback for the request; and initiating a timer for receiving the GTS indication.

Aspect 18: The method of any of Aspects 1-17, further comprising: transmitting, to another UE, an additional GTS indication based at least in part on a determination that the UE is not to transmit data to the other UE; and transmitting, to the other UE, a request to receive the GTS indication based at least in part on a determination that the UE is not to receive data from the other UE.

Aspect 19: The method of any of Aspects 1-17, wherein the GTS indication that is received indicates that another UE is not to transmit data to the UE and is not to receive data from the UE.

Aspect 20: The method of any of Aspects 1-17, wherein the GTS indication is received from another UE, and wherein the GTS indication includes a first bit indicating whether the UE is to sleep and a second bit indicating whether the other UE is to sleep.

Aspect 21: The method of any of Aspects 1, 2, or 4-10, wherein the GTS indication that is transmitted indicates that the UE is to sleep and is not to receive data.

Aspect 22: An apparatus for wireless communication at a device, comprising a processor; memory coupled with the processor; and instructions stored in the memory and executable by the processor to cause the apparatus to perform the method of one or more Aspects of Aspects 1-21.

Aspect 23: A device for wireless communication, comprising a memory and one or more processors coupled to the memory, the memory and the one or more processors configured to perform the method of one or more Aspects of Aspects 1-21.

Aspect 24: An apparatus for wireless communication, comprising at least one means for performing the method of one or more Aspects of Aspects 1-21.

Aspect 25: A non-transitory computer-readable medium storing code for wireless communication, the code comprising instructions executable by a processor to perform the method of one or more Aspects of Aspects 1-21.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories storing instructions configurable to be executed by the one or more processors to cause the UE to:
   receive, from another UE, a go-to-sleep (GTS) indication relating to sidelink communication; and
   enter a sleep state based at least in part on the GTS indication.

2. The UE of claim 1, wherein the GTS indication is received during an active duration of a sidelink discontinuous reception (DRX) operation.

3. The UE of claim 1, wherein the GTS indication identifies at least one of a source identifier or a destination identifier associated with the GTS indication.

4. The UE of claim 1, wherein the GTS indication indicates that the UE is not to receive data from the other UE.

5. The UE of claim 1, wherein the UE is in a sidelink mode in which UEs perform resource selection, and the UE is not to transmit sidelink data, and
   wherein the instructions configurable to be executed to cause the UE to enter the sleep state, are further executable by the one or more processors to cause the UE to:
   refrain from monitoring both a physical sidelink control channel and a physical sidelink shared channel.

6. The UE of claim 1, wherein the UE is in a sidelink mode in which UEs perform resource selection, and the UE is to transmit sidelink data, and
   wherein the instructions configurable to be executed to cause the UE to enter the sleep state, are further executable by the one or more processors to cause the UE to:
   monitor a physical sidelink control channel for first stage sidelink control information and refrain from monitoring a physical sidelink shared channel for second stage sidelink control information.

7. The UE of claim 1, wherein the UE is in a sidelink mode in which a network entity performs resource allocation, and
   wherein the instructions configurable to be executed to cause the UE to enter the sleep state, are further executable by the one or more processors to cause the UE to;
   refrain from monitoring both a physical sidelink control channel and a physical sidelink shared channel.

8. The UE of claim 1, wherein the GTS indication is associated with a sidelink session, of a plurality of sidelink sessions, of the UE, and
   wherein the sleep state is entered based at least in part on a determination that each of the plurality of sidelink sessions is associated with a respective GTS indication.

9. The UE of claim 1, wherein the UE is enabled to support GTS indication for a first cast type, and the UE is not enabled to support GTS indication for a second cast type.

10. The UE of claim 1, wherein the instructions are further executable by the one or more processors to cause the UE to:
    transmit a request to receive the GTS indication.

11. The UE of claim 10, wherein the request indicates a duration for which the UE is to sleep.

12. The UE of claim 10, wherein the request is a sequence-based request.

13. The UE of claim 10, wherein the request is indicated in a communication of a physical sidelink control channel or a physical sidelink shared channel.

14. The UE of claim 10, wherein the GTS indication is indicated by acknowledgment feedback for the request.

15. The UE of claim 10, wherein the instructions are further executable by the one or more processors to cause the UE to:
    receive acknowledgment feedback for the request prior to receiving the GTS indication.

16. The UE of claim 10, wherein the instructions are further executable by the one or more processors to cause the UE to:
    receive acknowledgment feedback for the request; and
    initiate a timer for receiving the GTS indication.

17. The UE of claim 1, wherein the instructions are further executable by the one or more processors to cause the UE to:
    transmit, to the other UE, an additional GTS indication based at least in part on a determination that the UE is not to transmit data to the other UE; and
    transmit, to the other UE, a request to receive the GTS indication based at least in part on a determination that the UE is not to receive data from the other UE.

18. The UE of claim 1, wherein the GTS indication that is received indicates that the other UE is not to transmit data to the UE and is not to receive data from the UE.

19. The UE of claim 1, wherein the GTS indication is received from the other UE, and
    wherein the GTS indication includes a first bit indicating whether the UE is to sleep and a second bit indicating whether the other UE is to sleep.

20. The UE of claim 1, wherein the GTS indication that is transmitted indicates that the UE is to sleep and is not to receive data.

21. A method of wireless communication performed by a user equipment (UE), comprising:
receiving, from another UE, a go-to-sleep (GTS) indication relating to sidelink communication; and
entering a sleep state based at least in part on the GTS indication.

22. The method of claim 21, wherein the GTS indication received during an active duration of a sidelink discontinuous reception (DRX) operation.

23. The method of claim 21, further comprising:
transmitting a request to receive the GTS indication.

24. The method of claim 23, wherein the GTS indication is indicated by acknowledgment feedback for the request.

25. The method of claim 21, further comprising:
transmitting, to the other UE, an additional GTS indication based at least in part on a determination that the UE is not to transmit data to the other UE; and
transmitting, to the other UE, a request to receive the GTS indication based at least in part on a determination that the UE is not to receive data from the other UE.

26. The method of claim 21, wherein the GTS indication that is received indicates that the other UE is not to transmit data to the UE and is not to receive data from the UE.

27. The method of claim 21, wherein the GTS indication is received from the other UE, and
wherein the GTS indication includes a first bit indicating whether the UE is to sleep and a second bit indicating whether the other UE is to sleep.

28. The method of claim 21, wherein the GTS indication that is transmitted indicates that the UE is to sleep and is not to receive data.

29. A non-transitory computer-readable medium storing one or more instructions for wireless communication, the one or more instructions, when executed by one or more processors of a user equipment (UE), cause the UE to:
receive, from another UE, a go-to-sleep (GTS) indication relating to sidelink communication; and
enter a sleep state based at least in part on the GTS indication.

30. An apparatus for wireless communication, comprising:
means for receiving, from another UE, a go-to-sleep (GTS) indication relating to sidelink communication; and
means for entering a sleep state based at least in part on the GTS indication.

* * * * *